(12) United States Patent
Sundaresan et al.

(10) Patent No.: US 9,264,384 B1
(45) Date of Patent: Feb. 16, 2016

(54) RESOURCE VIRTUALIZATION MECHANISM INCLUDING VIRTUAL HOST BUS ADAPTERS

(75) Inventors: Ganesh Sundaresan, San Jose, CA (US); Raymond Lim, Los Altos Hills, CA (US); Shreyas Shah, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2223 days.

(21) Appl. No.: 11/083,258

(22) Filed: Mar. 16, 2005

Related U.S. Application Data

(60) Provisional application No. 60/590,450, filed on Jul. 22, 2004.

(51) Int. Cl.
*G06F 13/00* (2006.01)
*G06F 15/16* (2006.01)
*G06F 15/173* (2006.01)
*H04L 12/28* (2006.01)
(Continued)

(52) U.S. Cl.
CPC .............. *H04L 49/70* (2013.01); *G06F 3/0601* (2013.01); *G06F 3/067* (2013.01); *G06F 3/0635* (2013.01); *G06F 3/0662* (2013.01); *G06F 3/0664* (2013.01); *G06F 11/2005* (2013.01); *G06F 13/12* (2013.01); *G06F 13/128* (2013.01); *G06F 13/4022* (2013.01); *G06F 13/42* (2013.01); *G06F 13/4221* (2013.01); *H04L 12/4641* (2013.01); *H04L 41/04* (2013.01); *H04L 49/00* (2013.01); *H04L 49/357* (2013.01); *H04L 67/1097* (2013.01); *G06F 2003/0697* (2013.01)

(58) Field of Classification Search
CPC ... H04L 12/4641; H04L 49/00; H04L 49/357; H04L 49/70; H04L 41/04; H04L 67/1097; G06F 13/128; G06F 13/12; G06F 3/0601; G06F 3/0603; G06F 3/0617; G06F 3/067; G06F 3/0635; G06F 3/0626; G06F 3/0664; G06F 3/0662; G06F 2003/0697; G06F 13/4022; G06F 11/2005; G06F 13/4261; G06F 13/4221; G06F 13/42
USPC ............ 710/36, 316; 709/238, 201, 223, 250; 370/398
See application file for complete search history.

(56) References Cited

U.S. PATENT DOCUMENTS

| | | |
|---|---|---|
| 5,621,913 A | 4/1997 | Tuttle et al. |
| 5,754,948 A | 5/1998 | Metze |

(Continued)

OTHER PUBLICATIONS

Figueiredo et al, "Resource Virtualization Renaissance", May 2005, IEEE Computer Society, pp. 28-31.

(Continued)

*Primary Examiner* — Daniel C Murray
(74) *Attorney, Agent, or Firm* — Kilpatrick Townsend & Stockton LLP

(57) ABSTRACT

Methods and apparatus are provided for virtualizing resources such as host bus adapters connected to a storage area network. Resources are offloaded from individual servers onto a resource virtualization switch. Servers are connected to the resource virtualization switch using an I/O bus connection. Servers are assigned resources such as virtual host bus adapters and share access to physical host bus adapters included in the resource virtualization switch. Redundancy can be provided using multipathing mechanisms.

28 Claims, 10 Drawing Sheets

(51) Int. Cl.
*H04L 12/931* (2013.01)
*G06F 13/40* (2006.01)
*G06F 13/12* (2006.01)
*H04L 12/24* (2006.01)
*H04L 12/46* (2006.01)
*H04L 29/08* (2006.01)
*G06F 11/20* (2006.01)
*G06F 13/42* (2006.01)
*G06F 3/06* (2006.01)

(56) References Cited

U.S. PATENT DOCUMENTS

| | | | |
|---|---|---|---|
| 5,815,675 A | 9/1998 | Steele et al. | |
| 5,898,815 A | 4/1999 | Bluhm et al. | |
| 6,003,112 A | 12/1999 | Tetrick | |
| 6,069,895 A | 5/2000 | Ayandeh | |
| 6,145,028 A * | 11/2000 | Shank et al. | 710/31 |
| 6,157,955 A * | 12/2000 | Narad et al. | 709/228 |
| 6,247,086 B1 | 6/2001 | Allingham | |
| 6,253,334 B1 | 6/2001 | Amdahl et al. | |
| 6,282,647 B1 * | 8/2001 | Leung et al. | 713/100 |
| 6,308,282 B1 | 10/2001 | Huang et al. | |
| 6,314,525 B1 | 11/2001 | Mahalingham et al. | |
| 6,331,983 B1 | 12/2001 | Haggerty et al. | |
| 6,343,324 B1 * | 1/2002 | Hubis et al. | 709/229 |
| 6,377,992 B1 | 4/2002 | Plaza et al. | |
| 6,393,483 B1 | 5/2002 | Latif et al. | |
| 6,401,117 B1 * | 6/2002 | Narad et al. | 709/223 |
| 6,418,494 B1 * | 7/2002 | Shatas et al. | 710/305 |
| 6,430,191 B1 | 8/2002 | Klausmeier et al. | |
| 6,466,993 B1 | 10/2002 | Bonola | |
| 6,470,397 B1 * | 10/2002 | Shah et al. | 709/250 |
| 6,578,128 B1 | 6/2003 | Arsenault et al. | |
| 6,594,329 B1 | 7/2003 | Susnow | |
| 6,628,608 B1 | 9/2003 | Lau et al. | |
| 6,708,297 B1 * | 3/2004 | Bassel | 714/47.3 |
| 6,725,388 B1 | 4/2004 | Susnow | |
| 6,757,725 B1 | 6/2004 | Frantz et al. | |
| 6,779,064 B2 * | 8/2004 | McGowen et al. | 710/104 |
| 6,804,257 B1 | 10/2004 | Benayoun et al. | |
| 6,807,581 B1 * | 10/2004 | Starr et al. | 709/250 |
| 6,823,458 B1 * | 11/2004 | Lee et al. | 726/16 |
| 6,898,670 B2 * | 5/2005 | Nahum | 711/114 |
| 6,931,511 B1 | 8/2005 | Weybrew et al. | |
| 6,937,574 B1 | 8/2005 | Delaney et al. | |
| 6,963,946 B1 * | 11/2005 | Dwork et al. | 710/310 |
| 6,970,921 B1 * | 11/2005 | Wang et al. | 709/220 |
| 7,011,845 B2 * | 3/2006 | Kozbor et al. | 424/450 |
| 7,046,668 B2 | 5/2006 | Pettey et al. | |
| 7,093,265 B1 * | 8/2006 | Jantz et al. | 719/321 |
| 7,096,308 B2 | 8/2006 | Main et al. | |
| 7,103,064 B2 | 9/2006 | Pettey et al. | |
| 7,103,888 B1 | 9/2006 | Cayton et al. | |
| 7,111,084 B2 * | 9/2006 | Tan et al. | 710/15 |
| 7,120,728 B2 * | 10/2006 | Krakirian et al. | 711/6 |
| 7,127,445 B2 * | 10/2006 | Mogi et al. | |
| 7,143,227 B2 | 11/2006 | Maine | |
| 7,159,046 B2 | 1/2007 | Mulla et al. | |
| 7,171,434 B2 | 1/2007 | Ibrahim et al. | |
| 7,171,495 B2 | 1/2007 | Matters et al. | |
| 7,181,211 B1 | 2/2007 | Phan-Anh | |
| 7,188,209 B2 | 3/2007 | Pettey et al. | |
| 7,203,842 B2 | 4/2007 | Kean | |
| 7,209,439 B2 | 4/2007 | Rawlins et al. | |
| 7,213,246 B1 | 5/2007 | van Rietschote et al. | |
| 7,219,183 B2 | 5/2007 | Pettey et al. | |
| 7,240,098 B1 * | 7/2007 | Mansee | 709/212 |
| 7,260,661 B2 | 8/2007 | Bury et al. | |
| 7,269,168 B2 * | 9/2007 | Roy et al. | 370/374 |
| 7,281,030 B1 | 10/2007 | Davis | |
| 7,281,077 B2 | 10/2007 | Woodral | |
| 7,281,169 B2 * | 10/2007 | Golasky et al. | 714/43 |
| 7,307,948 B2 * | 12/2007 | Infante et al. | 370/225 |
| 7,308,551 B2 * | 12/2007 | Arndt et al. | 711/173 |
| 7,334,178 B1 | 2/2008 | Aulagnier | |
| 7,345,689 B2 | 3/2008 | Janus et al. | |
| 7,346,716 B2 | 3/2008 | Bogin et al. | |
| 7,360,017 B2 * | 4/2008 | Higaki et al. | 711/114 |
| 7,366,842 B1 | 4/2008 | Acocella et al. | |
| 7,386,637 B2 | 6/2008 | Arndt et al. | |
| 7,412,536 B2 | 8/2008 | Oliver et al. | |
| 7,421,710 B2 * | 9/2008 | Qi et al. | 719/321 |
| 7,424,529 B2 * | 9/2008 | Hubis | 709/224 |
| 7,433,300 B1 * | 10/2008 | Bennett et al. | 370/216 |
| 7,457,897 B1 | 11/2008 | Lee et al. | |
| 7,457,906 B2 | 11/2008 | Pettey et al. | |
| 7,493,416 B2 * | 2/2009 | Pettey | 709/250 |
| 7,502,884 B1 * | 3/2009 | Shah et al. | 710/316 |
| 7,509,436 B1 * | 3/2009 | Rissmeyer | 709/249 |
| 7,516,252 B2 * | 4/2009 | Krithivas | 710/37 |
| 7,602,774 B1 * | 10/2009 | Sundaresan et al. | 370/381 |
| 7,606,260 B2 | 10/2009 | Oguchi et al. | |
| 7,609,723 B2 | 10/2009 | Munguia | |
| 7,634,650 B1 * | 12/2009 | Shah et al. | 713/150 |
| 7,669,000 B2 * | 2/2010 | Sharma et al. | 710/310 |
| 7,711,789 B1 * | 5/2010 | Jnagal et al. | 709/213 |
| 7,733,890 B1 * | 6/2010 | Droux et al. | 370/412 |
| 7,782,869 B1 | 8/2010 | Chitlur Srinivasa | |
| 7,783,788 B1 | 8/2010 | Quinn et al. | |
| 7,792,923 B2 * | 9/2010 | Kim | 709/218 |
| 7,793,298 B2 | 9/2010 | Billau et al. | |
| 7,821,973 B2 * | 10/2010 | McGee et al. | 370/306 |
| 7,836,332 B2 * | 11/2010 | Hara et al. | 714/5.11 |
| 7,843,907 B1 | 11/2010 | Abou-Emara et al. | |
| 7,849,153 B2 * | 12/2010 | Kim | 709/217 |
| 7,865,626 B2 * | 1/2011 | Hubis | 710/5 |
| 7,870,225 B2 * | 1/2011 | Kim | 709/217 |
| 7,899,928 B1 | 3/2011 | Naik et al. | |
| 7,933,993 B1 * | 4/2011 | Skinner | 709/226 |
| 7,937,447 B1 * | 5/2011 | Cohen et al. | 709/212 |
| 7,941,814 B1 | 5/2011 | Okcu et al. | |
| 8,041,875 B1 * | 10/2011 | Shah et al. | 710/316 |
| 8,180,872 B1 * | 5/2012 | Marinelli et al. | 709/223 |
| 8,180,949 B1 * | 5/2012 | Shah et al. | 710/316 |
| 8,185,664 B1 * | 5/2012 | Lok et al. | 709/250 |
| 8,195,854 B1 * | 6/2012 | Sihare | 710/74 |
| 8,200,871 B2 * | 6/2012 | Rangan et al. | 710/74 |
| 8,218,538 B1 * | 7/2012 | Chidambaram et al. | 370/386 |
| 8,228,820 B2 * | 7/2012 | Gopal Gowda et al. | 370/254 |
| 8,261,068 B1 * | 9/2012 | Raizen et al. | 713/165 |
| 8,285,907 B2 * | 10/2012 | Chappell et al. | 710/305 |
| 8,291,148 B1 * | 10/2012 | Shah et al. | 710/316 |
| 8,387,044 B2 * | 2/2013 | Yamada et al. | 718/1 |
| 8,392,645 B2 * | 3/2013 | Miyoshi | 710/312 |
| 8,397,092 B2 * | 3/2013 | Karnowski | 713/324 |
| 8,443,119 B1 * | 5/2013 | Limaye et al. | 710/31 |
| 8,458,306 B1 | 6/2013 | Sripathi | |
| 8,677,023 B2 * | 3/2014 | Venkataraghavan et al. | 709/250 |
| 8,892,706 B1 | 11/2014 | Dalal | |
| 9,064,058 B2 * | 6/2015 | Daniel | H04L 69/16 |
| 9,083,550 B2 | 7/2015 | Cohen et al. | |
| 2001/0032280 A1 * | 10/2001 | Osakada et al. | 710/129 |
| 2001/0037406 A1 * | 11/2001 | Philbrick et al. | 709/250 |
| 2002/0023151 A1 * | 2/2002 | Iwatani | 709/223 |
| 2002/0065984 A1 | 5/2002 | Thompson et al. | |
| 2002/0069245 A1 * | 6/2002 | Kim | 709/203 |
| 2002/0146448 A1 * | 10/2002 | Kozbor et al. | 424/450 |
| 2002/0152327 A1 | 10/2002 | Kagan et al. | |
| 2003/0007505 A1 | 1/2003 | Noda et al. | |
| 2003/0028716 A1 | 2/2003 | Sved | |
| 2003/0037177 A1 | 2/2003 | Sutton et al. | |
| 2003/0051076 A1 | 3/2003 | Webber | |
| 2003/0081612 A1 | 5/2003 | Goetzinger et al. | |
| 2003/0093501 A1 * | 5/2003 | Carlson et al. | 709/220 |
| 2003/0099254 A1 | 5/2003 | Richter | |
| 2003/0110364 A1 | 6/2003 | Tang et al. | |
| 2003/0126315 A1 * | 7/2003 | Tan et al. | 710/1 |
| 2003/0126320 A1 | 7/2003 | Liu et al. | |
| 2003/0126344 A1 * | 7/2003 | Hodapp, Jr. | 710/306 |
| 2003/0131182 A1 * | 7/2003 | Kumar et al. | 711/5 |
| 2003/0165140 A1 | 9/2003 | Tang et al. | |
| 2003/0172149 A1 * | 9/2003 | Edsall et al. | 709/224 |
| 2003/0200315 A1 | 10/2003 | Goldenberg et al. | |

(56) References Cited

U.S. PATENT DOCUMENTS

| | | | |
|---|---|---|---|
| 2003/0208614 A1* | 11/2003 | Wilkes | 709/232 |
| 2003/0212755 A1* | 11/2003 | Shatas et al. | 709/217 |
| 2003/0226018 A1 | 12/2003 | Tardo et al. | |
| 2003/0229645 A1* | 12/2003 | Mogi et al. | 707/102 |
| 2004/0003141 A1 | 1/2004 | Matters et al. | |
| 2004/0003154 A1 | 1/2004 | Harris et al. | |
| 2004/0008713 A1 | 1/2004 | Knight et al. | |
| 2004/0025166 A1* | 2/2004 | Adlung et al. | 719/310 |
| 2004/0028063 A1* | 2/2004 | Roy et al. | 370/402 |
| 2004/0030857 A1* | 2/2004 | Krakirian et al. | 711/206 |
| 2004/0034718 A1 | 2/2004 | Goldenberg et al. | |
| 2004/0054776 A1* | 3/2004 | Klotz et al. | 709/224 |
| 2004/0057441 A1 | 3/2004 | Li et al. | |
| 2004/0064590 A1* | 4/2004 | Starr et al. | 709/250 |
| 2004/0078632 A1* | 4/2004 | Infante et al. | 714/5 |
| 2004/0081145 A1 | 4/2004 | Harrekilde-Petersen et al. | |
| 2004/0107300 A1* | 6/2004 | Padmanabhan et al. | 710/1 |
| 2004/0123013 A1 | 6/2004 | Clayton et al. | |
| 2004/0139237 A1* | 7/2004 | Rangan et al. | 710/1 |
| 2004/0151188 A1* | 8/2004 | Maveli et al. | 370/398 |
| 2004/0160970 A1 | 8/2004 | Dally et al. | |
| 2004/0172494 A1 | 9/2004 | Pettey et al. | |
| 2004/0179529 A1 | 9/2004 | Pettey et al. | |
| 2004/0210623 A1 | 10/2004 | Hydrie et al. | |
| 2004/0218579 A1 | 11/2004 | An | |
| 2004/0225719 A1 | 11/2004 | Kisley et al. | |
| 2004/0225764 A1* | 11/2004 | Pooni et al. | 710/38 |
| 2004/0233933 A1 | 11/2004 | Munguia | |
| 2004/0236877 A1 | 11/2004 | Burton | |
| 2005/0010688 A1* | 1/2005 | Murakami et al. | 709/245 |
| 2005/0033878 A1* | 2/2005 | Pangal et al. | 710/36 |
| 2005/0039063 A1 | 2/2005 | Hsu et al. | |
| 2005/0044301 A1* | 2/2005 | Vasilevsky et al. | 711/1 |
| 2005/0050191 A1* | 3/2005 | Hubis | 709/223 |
| 2005/0058085 A1 | 3/2005 | Shapiro et al. | |
| 2005/0066045 A1* | 3/2005 | Johnson et al. | 709/230 |
| 2005/0080923 A1 | 4/2005 | Elzur | |
| 2005/0080982 A1* | 4/2005 | Vasilevsky et al. | 711/1 |
| 2005/0091441 A1* | 4/2005 | Qi et al. | 711/5 |
| 2005/0108407 A1 | 5/2005 | Johnson et al. | |
| 2005/0111483 A1 | 5/2005 | Cripe et al. | |
| 2005/0114569 A1 | 5/2005 | Bogin et al. | |
| 2005/0114595 A1* | 5/2005 | Karr et al. | 711/114 |
| 2005/0120160 A1* | 6/2005 | Plouffe et al. | 711/1 |
| 2005/0141425 A1 | 6/2005 | Foulds | |
| 2005/0160251 A1 | 7/2005 | Zur et al. | |
| 2005/0182853 A1* | 8/2005 | Lewites et al. | 709/238 |
| 2005/0188239 A1* | 8/2005 | Golasky et al. | 714/2 |
| 2005/0198410 A1 | 9/2005 | Kagan et al. | |
| 2005/0198523 A1 | 9/2005 | Shanbhag et al. | |
| 2005/0232285 A1* | 10/2005 | Terrell et al. | 370/401 |
| 2005/0238035 A1 | 10/2005 | Riley | |
| 2005/0240621 A1 | 10/2005 | Robertson et al. | |
| 2005/0240932 A1 | 10/2005 | Billau et al. | |
| 2005/0262269 A1 | 11/2005 | Pike | |
| 2006/0004983 A1 | 1/2006 | Tsao et al. | |
| 2006/0007937 A1 | 1/2006 | Sharma | |
| 2006/0010287 A1* | 1/2006 | Kim | 711/112 |
| 2006/0013240 A1 | 1/2006 | Ma et al. | |
| 2006/0045098 A1* | 3/2006 | Krause | 370/396 |
| 2006/0050693 A1 | 3/2006 | Bury et al. | |
| 2006/0059400 A1 | 3/2006 | Clark et al. | |
| 2006/0092928 A1* | 5/2006 | Pike et al. | 370/355 |
| 2006/0129699 A1 | 6/2006 | Kagan et al. | |
| 2006/0136570 A1 | 6/2006 | Pandya | |
| 2006/0168286 A1 | 7/2006 | Makhervaks et al. | |
| 2006/0168306 A1 | 7/2006 | Makhervaks et al. | |
| 2006/0179178 A1 | 8/2006 | King | |
| 2006/0182034 A1 | 8/2006 | Klinker et al. | |
| 2006/0184711 A1* | 8/2006 | Pettey et al. | 710/316 |
| 2006/0193327 A1 | 8/2006 | Arndt et al. | |
| 2006/0200584 A1 | 9/2006 | Bhat | |
| 2006/0212608 A1 | 9/2006 | Arndt et al. | |
| 2006/0224843 A1 | 10/2006 | Rao et al. | |
| 2006/0233168 A1* | 10/2006 | Lewites et al. | 370/389 |
| 2006/0242332 A1 | 10/2006 | Johnsen et al. | |
| 2006/0253619 A1 | 11/2006 | Torudbakken et al. | |
| 2006/0282591 A1* | 12/2006 | Krithivas | 710/269 |
| 2006/0292292 A1 | 12/2006 | Brightman et al. | |
| 2007/0050520 A1* | 3/2007 | Riley | 709/239 |
| 2007/0067435 A1 | 3/2007 | Landis et al. | |
| 2007/0101173 A1 | 5/2007 | Fung | |
| 2007/0112574 A1 | 5/2007 | Greene | |
| 2007/0112963 A1 | 5/2007 | Dykes et al. | |
| 2007/0130295 A1 | 6/2007 | Rastogi et al. | |
| 2007/0220170 A1 | 9/2007 | Abjanic et al. | |
| 2007/0286233 A1* | 12/2007 | Latif et al. | 370/466 |
| 2008/0025217 A1 | 1/2008 | Gusat et al. | |
| 2008/0082696 A1 | 4/2008 | Bestler | |
| 2008/0159260 A1 | 7/2008 | Vobbilisetty et al. | |
| 2008/0192648 A1* | 8/2008 | Galles | 370/254 |
| 2008/0205409 A1 | 8/2008 | McGee et al. | |
| 2008/0225877 A1* | 9/2008 | Yoshida | 370/419 |
| 2008/0270726 A1 | 10/2008 | Elnozahy et al. | |
| 2008/0288627 A1* | 11/2008 | Hubis | 709/223 |
| 2008/0301692 A1 | 12/2008 | Billau et al. | |
| 2008/0307150 A1 | 12/2008 | Stewart et al. | |
| 2009/0070422 A1 | 3/2009 | Kashyap et al. | |
| 2009/0106470 A1* | 4/2009 | Sharma et al. | 710/301 |
| 2009/0307388 A1* | 12/2009 | Tchapda | 710/33 |
| 2010/0088432 A1* | 4/2010 | Itoh | 710/16 |
| 2010/0138602 A1* | 6/2010 | Kim | 711/112 |
| 2010/0195549 A1 | 8/2010 | Aragon et al. | |
| 2010/0232450 A1* | 9/2010 | Maveli | H04L 12/4641 370/419 |
| 2010/0293552 A1* | 11/2010 | Allen et al. | 718/105 |
| 2011/0153715 A1* | 6/2011 | Oshins et al. | 709/203 |
| 2011/0154318 A1 | 6/2011 | Oshins et al. | |
| 2012/0079143 A1 | 3/2012 | Krishnamurthi et al. | |
| 2012/0110385 A1* | 5/2012 | Fleming et al. | 714/39 |
| 2012/0144006 A1 | 6/2012 | Wakamatsu et al. | 709/220 |
| 2012/0158647 A1* | 6/2012 | Yadappanavar et al. | 707/609 |
| 2012/0163376 A1* | 6/2012 | Shukla et al. | 370/388 |
| 2012/0163391 A1* | 6/2012 | Shukla et al. | 370/401 |
| 2012/0166575 A1* | 6/2012 | Ogawa et al. | 709/217 |
| 2012/0167080 A1* | 6/2012 | Vilayannur et al. | 718/1 |
| 2012/0209905 A1* | 8/2012 | Haugh et al. | 709/203 |
| 2012/0239789 A1* | 9/2012 | Ando et al. | 709/220 |
| 2012/0304168 A1* | 11/2012 | Raj Seeniraj et al. | 718/1 |
| 2013/0031200 A1* | 1/2013 | Gulati et al. | 709/213 |
| 2013/0080610 A1* | 3/2013 | Ando | 709/221 |
| 2013/0117421 A1 | 5/2013 | Wimmer | |
| 2013/0117485 A1* | 5/2013 | Varchavtchik et al. | 710/300 |
| 2013/0138758 A1 | 5/2013 | Cohen et al. | |
| 2013/0138836 A1* | 5/2013 | Cohen et al. | 709/250 |
| 2013/0145072 A1* | 6/2013 | Venkataraghavan et al. | 710/316 |
| 2013/0159637 A1 | 6/2013 | Forgette et al. | |
| 2013/0179532 A1* | 7/2013 | Tameshige et al. | 709/213 |
| 2013/0201988 A1 | 8/2013 | Zhou et al. | |
| 2014/0122675 A1* | 5/2014 | Cohen et al. | 709/223 |
| 2015/0134854 A1* | 5/2015 | Tchapda | G06F 3/061 710/3 |

OTHER PUBLICATIONS

Ajay V. Bhatt, "Creating a Third Generation I/O Interconnect", Intel® Developer Network for PCI Express* Architecture, www.express-lane.org, pp. 1-11.

U.S. Appl. No. 11/145,698, Final Office Action mailed Jul. 6, 2011, 29 pages.

U.S. Appl. No. 11/145,698, Non-final Office Action mailed Mar. 16, 2011, 30 pages.

U.S. Appl. No. 11/145,698, Final Office Action mailed Aug. 18, 2009, 27 pages.

U.S. Appl. No. 11/145,698, Non-final Office Action mailed Mar. 31, 2009, 27 pages.

Wikipedia's article on 'Infiniband', Aug. 2010.

U.S. Appl. No. 11/086,117, Final Office Action mailed on Dec. 23, 2008, 11 pages.

U.S. Appl. No. 11/086,117, Final Office Action mailed on Dec. 10, 2009, 18 pages.

U.S. Appl. No. 11/086,117, Non-Final Office Action mailed on May 6, 2009, 12 pages.

(56) References Cited

OTHER PUBLICATIONS

U.S. Appl. No. 11/086,117, Non-Final Office Action mailed on Jul. 22, 2008, 13 pages.
U.S. Appl. No. 11/086,117, Non-Final Office Action mailed on Jul. 22, 2010, 24 pages.
U.S. Appl. No. 11/086,117, Notice of Allowance mailed on Dec. 27, 2010, 15 pages.
U.S. Appl. No. 11/145,698, Non-Final Office Action mailed on May 9, 2013, 13 pages.
U.S. Appl. No. 11/179,085, Final Office Action mailed on Oct. 30, 2007, 13 pages.
U.S. Appl. No. 11/179,085, Non-Final Office Action mailed on May 31, 2007, 14 pages.
U.S. Appl. No. 11/179,085, Notice of Allowance mailed on Aug. 11, 2008, 4 pages.
U.S. Appl. No. 11/179,085, Pre Appeal Brief Request mailed on Jan. 24, 2008, 6 pages.
U.S. Appl. No. 11/179,085, Preliminary Amendment mailed on May 27, 2008, 9 pages.
U.S. Appl. No. 11/179,085, Response to Non-final Office Action filed on Aug. 10, 2007, 8 pages.
U.S. Appl. No. 11/179,085, filed Jul. 11, 2005.
U.S. Appl. No. 11/179,437, Final Office Action mailed on Jan. 8, 2009, 13 pages.
U.S. Appl. No. 11/179,437, Non-Final Office Action mailed on May 8, 2008, 11 pages.
U.S. Appl. No. 11/179,437, Notice of Allowance mailed on Jun. 1, 2009, 8 pages.
U.S. Appl. No. 11/179,437, filed Jul. 11, 2005.
U.S. Appl. No. 11/184,306, Non-Final Office Action mailed on Apr. 10, 2009, 5 pages.
U.S. Appl. No. 11/184,306, Notice of Allowance mailed on Aug. 10, 2009, 4 pages.
U.S. Appl. No. 11/200,761, Final Office Action mailed on Jul. 9, 2010, 22 pages.
U.S. Appl. No. 11/200,761, Final Office Action mailed on Aug. 13, 2009, 22 pages.
U.S. Appl. No. 11/200,761, Non-Final Office Action mailed on Jun. 11, 2013, 21 pages.
U.S. Appl. No. 11/200,761, Non-Final Office Action mailed on Aug. 31, 2012, 21 pages.
U.S. Appl. No. 11/200,761, Non-Final Office Action mailed on Jan. 20, 2010, 22 pages.
U.S. Appl. No. 11/200,761, Non-Final Office Action mailed on Mar. 12, 2009, 22 pages.
U.S. Appl. No. 11/200,761, Office Action mailed on Feb. 7, 2013, 22 pages.
U.S. Appl. No. 11/200,761, U.S. Patent Application mailed on Aug. 9, 2005, 32 pages.
U.S. Appl. No. 11/222,590, Non-Final Office Action mailed on Mar. 21, 2007, 6 pages.
U.S. Appl. No. 11/222,590, Notice of Allowance mailed on Sep. 18, 2007, 5 pages.
U.S. Appl. No. 12/250,842, Allowed Claims mailed on Jun. 10, 2011.
U.S. Appl. No. 12/250,842, Non-Final Office Action mailed on Aug. 10, 2010, 9 pages.
U.S. Appl. No. 12/250,842, Notice of Allowance mailed on Feb. 18, 2011, 5 pages.
U.S. Appl. No. 12/250,842, Notice of Allowance mailed on Jun. 10, 2011, 5 pages.
U.S. Appl. No. 12/250,842, Response to Non-Final Office Action filed on Nov. 19, 2010, 8 pages.
U.S. Appl. No. 12/250,842, filed Oct. 14, 2008.
U.S. Appl. No. 12/544,744, Final Office Action mailed on Feb. 27, 2013, 27 pages.
U.S. Appl. No. 12/544,744, Non-Final Office Action mailed on Jun. 6, 2012, 26 pages.
U.S. Appl. No. 12/862,977, Non-Final Office Action mailed on Mar. 1, 2012, 8 pages.
U.S. Appl. No. 12/862,977, Non-Final Office Action mailed on Aug. 29, 2012, 9 pages.
U.S. Appl. No. 12/862,977, Notice of Allowance mailed on Feb. 7, 2013, 11 pages.
U.S. Appl. No. 12/890,498, Non-Final Office Action mailed on Nov. 13, 2011, 10 pages.
U.S. Appl. No. 12/890,498, Non-Final Office Action mailed on May 21, 2013, 22 pages.
U.S. Appl. No. 13/229,587, Non-Final Office Action mailed on Oct. 6, 2011, 4 pages.
U.S. Appl. No. 13/229,587, Notice of Allowance mailed on Jan. 19, 2012, 5 pages.
U.S. Appl. No. 13/229,587, Response to Non-Final Office Action filed on Jan. 4, 2012, 4 pages.
U.S. Appl. No. 13/445,570, Notice of Allowance mailed on Jun. 20, 2012, 5 pages.
Kesavan et al., Active CoordinaTion (ACT)—Toward Effectively Managing Virtualized Multicore Clouds, IEEE, 2008.
Liu et al., High Performance RDMA-Based MPI Implementation over InfiniBand, ICS'03, San Francisco, ACM, Jun. 23-26, 2003, 10 pages.
Poulton, Xsigo—Try it out, I dare you, Nov. 16, 2009.
Ranadive et al., IBMon: Monitoring VMM-Bypass Capable InfiniBand Devices using Memory Introspection, ACM, 2009.
Wong et al., Effective Generation of Test Sequences for Structural Testing of Concurrent Programs, IEEE International Conference of Complex Computer Systems (ICECCS'05), 2005.
Xu et al., Performance Virtualization for Large-Scale Storage Systems, IEEE, 2003, 10 pages.
U.S. Appl. No. 11/145,698, Non-Final Office Action mailed on Mar. 16, 2011, 23 pages.
U.S. Appl. No. 11/145,698, Non-Final Office Action mailed on Mar. 31, 2009, 22 pages.
U.S. Appl. No. 11/145,698, Final Office Action mailed on Jul. 6, 2011, 26 pages.
U.S. Appl. No. 11/145,698, Final Office Action mailed on Aug. 18, 2009, 22 pages.
U.S. Appl. No. 11/145,698, Notice of Allowance, mailed Oct. 24, 2013, 15 pages.
U.S. Appl. No. 11/200,761 Final Office Action mailed Jan. 9, 2014, 23 pages.
International Search Report and Written Opinion of PCT/US2013/065008 mailed on Apr. 16, 2014, 17 pages.
U.S. Appl. No. 11/200,761, Advisory Action mailed on Oct. 21, 2009, 2 pages.
U.S. Appl. No. 11/200,761, Advisory Action mailed on Apr. 19, 2013, 3 pages.
U.S. Appl. No. 11/200,761, Advisory Action mailed on Aug. 31, 2010, 3 pages.
U.S. Appl. No. 12/544,744, Final Office Acton mailed on Nov. 7, 2014, 32 pages.
U.S. Appl. No. 12/890,496, Advisory Action mailed on Apr. 16, 2012, 4 pages.
U.S. Appl. No. 13/663,405, Notice of Allowance mailed on Mar. 12, 2015, 13 pages.
HTTP Persistent Connection Establishment, Management and Termination, section of 'The TCP/IP Guide' version 3.0, Sep. 20, 2005, 2 pages.
TCP Segment Retransmission Timers and the Retransmission Queue, section of 'The TCP/IP Guide' version 3.0, Sep. 20, 2005, 3 pages.
TCP Window Size Adjustment and Flow Control, section of 'The TCP/IP Guide' version 3.0, Sep. 20, 2005, 2 pages.
Balakrishnan et al., Improving TCP/IP Performance over Wireless Networks, Proc. 1st ACM Int'l Conf. on Mobile Computing and Networking (Mobicom), Nov. 1995, 10 pages.
U.S. Appl. No. 12/890,498, Final Office Action mailed on Jun. 17, 2015, 24 pages.
U.S. Appl. No. 12/890,498, Advisory Action mailed on Jan. 27, 2015, 3 pages.
U.S. Appl. No. 12/890,498, Final Office Action mailed on Nov. 19, 2014, 21 pages.

(56) References Cited

OTHER PUBLICATIONS

U.S. Appl. No. 11/200,761, Non-Final Office Action mailed on Mar. 11, 2015, 24 pages.

U.S. Appl. No. 12/890,498, Non-Final Office Action mailed on Mar. 5, 2015, 24 pages.

U.S. Appl. No. 13/663,405, Non-Final Office Action mailed on Nov. 21, 2014, 19 pages.

Spanbauer, Wired or Wireless, Choose Your Network, PCWorld, Sep. 30, 2003, 9 pages.

U.S. Appl. No. 12/544,744, Non-Final Office Action mailed on Apr. 4, 2014, 30 pages.

Marshall, D. "Xsigo Systems Launches Company and I/O Virtualization Product", vmblog.com, Sep. 15, 2007, 4 pages. Retrieved from http:/lvmblog.com/archive/2007/09/15/xsigo-systems-launches-company-and-i-o-virtualization-product.aspx, accessed on Mar. 24, 2014.

U.S. Appl. No. 12/890,498, Final Office Action mailed on Feb. 7, 2012, 9 pages.

U.S. Appl. No. 12/544,744, Non-Final Office Action mailed on Sep. 24, 2015, 29 pages.

U.S. Appl. No. 12/890,498, Advisory Action mailed on Aug. 25, 2015, 3 pages.

* cited by examiner

RESOURCE VIRTUALIZATION MECHANISM INCLUDING VIRTUAL HOST BUS ADAPTERS

CROSS-REFERENCE TO RELATED APPLICATIONS

This application claims priority from U.S. Provisional Patent Application No. 60/590,450 titled METHODS AND APPARATUS FOR RESOURCE VIRTUALIZATION, filed on Jul. 22, 2004 by Shreyas Shah, Subramanian Vinod, R. K. Anand, and Ashok Krishnamurthi, the entirety of which is incorporated by reference for all purposes.

BACKGROUND OF THE INVENTION

1. Field of the Invention

The present invention relates to resource virtualization. In one example, the present invention relates to methods and apparatus for efficiently virtualizing, allocating, and managing resources used to connect servers to storage area networks.

2. Description of Related Art

Conventional servers connect to storage area networks such as fibre channel fabric storage area networks using host bus adapters (HBAs). In many implementations, multiple HBAs are included in each server to provide for redundancy and load sharing. Each HBA is connected to a fibre channel switch port. If many servers are connected to a storage area network, a large number of HBAs and fibre channel switch ports are required. A large number of HBAs and fibre channel switch ports are required even though many HBAs and switch ports remain underutilized.

Some virtualization work has been done to provide shared access to a fibre channel storage area network within a particular server. Multiple operating systems included on a server may have limited shared access to a fibre channel storage area network. N-port virtualization in fibre channel allows for multiple initiators in a single HBA within a single server. Some solutions have allowed sharing of connectivity using gateway techniques through Ethernet. However, these solutions are high latency and low bandwidth, often unsuitable for typical storage area network applications and data center applications.

However, techniques and mechanisms for sharing resources such as HBAs and sharing connectivity to fibre channel storage area networks are limited. In many instances, conventional mechanisms still lead to underutilization and resource inflexibility. Network administration issues also remain complicated with the need for a large number of HBAs and switch ports. Consequently, it is desirable to provide methods and apparatus for more efficiently connecting servers to fibre channel storage area networks.

SUMMARY OF THE INVENTION

Methods and apparatus are provided for virtualizing resources such as host bus adapters connected to a storage area network. Resources are offloaded from individual servers onto a resource virtualization switch. Servers are connected to the resource virtualization switch using an I/O bus connection. Servers are assigned resources such as virtual host bus adapters and share access to physical host bus adapters included in the resource virtualization switch. Redundancy can be provided using multipathing mechanisms.

In one embodiment, a resource virtualization switch coupled to a storage area network is provided. The resource virtualization switch includes multiple port adapters, an I/O bus switch, and a resource virtualization switch platform. The port adapters are connected to a storage area network having storage area network ports associated with storage area network switches. The I/O bus switch is connected to multiple servers. The resource virtualization switch platform is operable to map communications from the first server and the second server onto a single port adapter.

In another embodiment, a technique for transmitting data is provided. Data is received data over an I/O bus connection from multiple servers including at least a first server and a second server. Data received from the first server and the second server is associated with a first port adapter at a resource virtualization switch. The first port adapter is connected to a storage area network switch. Data is transmitted to the storage area network switch using the first port adapter.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
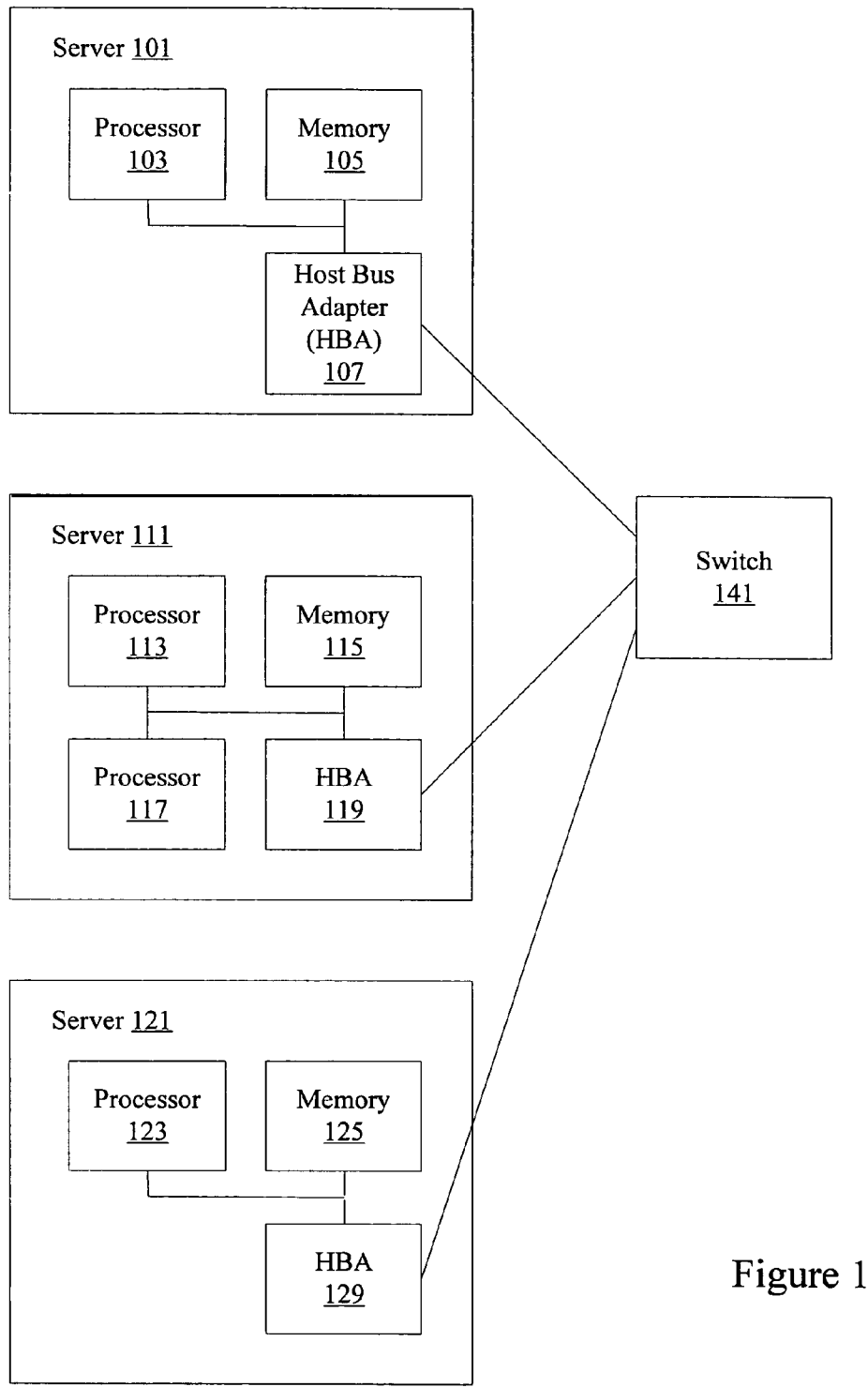
FIG. 1 is a diagrammatic representation showing typical server configuration.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Peripheral Control Interface (PCI) Express and fibre channel. However, it should be noted that the techniques of the present invention can be applied to a variety of different standards and variations to PCI Express and fibre channel. For example, storage area networks may be implemented using fibre channel, but storage area networks can also be implemented using other protocols such as internet Small Computer Systems Interface (iSCSI). Although fibre channel based storage area network terms will be used, it should be recognized that the techniques of the present invention should not be limited to fibre channel.

In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A server or computing system generally includes one or more processors, memory, as well as other peripheral components and peripheral interfaces such as host bus adapters (HBA), hardware accelerators, network interface cards (NIC), graphics accelerators, disks, etc. To increase processing power, servers are often aggregated as blades in a rack or as servers on a server farm or data center and interconnected using various network backbones or backplanes. In some examples, each server includes an HBA configured to allow communication over a storage area network. The fibre channel fabric can be used to implement a storage area network having storage resources such as disk arrays and tape devices. The storage area network also typically includes storage area network switches that allow routing of traffic between various storage resources. To provide fault-tolerance, individual servers are often configured with redundant resources.

For example, a server may include multiple HBAs to allow for continued operation in the event of adapter failure. Each server may also have multiple CPUs or multiple network cards to provide for fault tolerance. However, providing redundant resources in each server in a server rack or server farm can be expensive. A server farm including 40 individual systems and 40 adapters would require typically an additional 40 adapters for redundancy on each particular system. Redundancy can conventionally be provided only in a rigid and inflexible manner. Having a large number of adapters also requires a large number of switch ports, leading to inefficient and expensive deployment.

Because resources such as peripheral components and peripheral interfaces are assigned on a per server or a per processor basis, other servers do not typically have access to these resources. In order to provide adequate resources for each server, resources are typically over-provisioned. That is, more bandwidth is provided than is typically needed. For example, HBAs are typically arranged to provide 1 G, 2G, or 4G of bandwidth. However, typical servers rarely use that amount. More network interface bandwidth is allocated than is typically used simply to handle worst-case or expected worst-case scenarios.

Resources are over-provisioned resulting in overall waste and low utilization. Resource assignment on a per server or a per processor basis also limits the ability to reconstruct or reconfigure a resource environment. For example, a system administrator may want to dynamically allocate unused HBA resources to other servers needing bandwidth. Conventional HBAs are also not hot pluggable, resulting in longer downtimes during server administrative operations such as upgrades.

Having a number of disparate servers also increases the complexity associated with individual system management. The servers would typically have to be individually administered without the benefit of centralized administration. Oftentimes, servers would be equipped with graphics cards and I/O subsystems to allow for system administrator access.

Conventional architectures create resource usage inefficiency, server management inefficiency, and reconfiguration inflexibility, along with a number of other drawbacks. Consequently, the techniques of the present invention provide for resources virtualization. According to various embodiments, each server no longer has access to a physical peripheral component or a physical peripheral interface such as an HBA, but instead has access to logical or virtual resources.

In some embodiments, resources such as HBAs are removed from individual servers and aggregated at a resource virtualization server or resource virtualization switch. In one example, the resource virtualization switch creates an on-demand provisioned and traffic engineered data center by seamlessly integrating with existing hardware and software infrastructure. The resource virtualization switch receives requests from individual servers over a bus interface such as PCI Express and determines what resources to provide to handle individual requests. For example, a first server may request to transmit data over a local area network. The request is routed to the resource virtualization switch that then determines how to handle the request. In one example, the request is forwarded to the HBA corresponding to the first server.

Access to resources such as I/O and hardware acceleration resources remains at the bus level. Any mechanism allowing interconnection of components in a computer system is referred to herein as a bus. Examples of buses include PCI, PCI Express, Vesa Local Bus (VLB), PCMCIA, and AGP. For example, master components (e.g. processors) initiate transactions such as read and write transactions over buses with slave components (e.g. memory) that respond to the read and write requests. Buses in a server are typically associated with a memory space to allow for use of the read and write transactions. Any device having one or more processors that are able to access a shared memory address space is referred to herein as a server, computer, or computing system.

In one example, a server includes multiple processors that can all access a shared virtual or physical memory space. Although each processor may own separate cache lines, each processor has access to memory lines in the memory address space. A server or computing system generally includes one or more processors, memory, as well as other peripheral components and peripheral interfaces such as host bus adapters (HBAs), hardware accelerators, network interface cards (NIC), graphics accelerators, disks, etc. A processor can communicate with a variety of entities including a storage area network.

According to various embodiments, HBAs are included in a resource virtualization switch connected to multiple servers using a bus interface such as PCI Express. The bus interface provides a low latency, high bandwidth connection between the multiple servers and the storage HBA in the resource virtualization switch. The resource virtualization switch aggregates several server memories into a unified memory or an aggregated memory address view to a storage area network controller and this enables the sharing of a physical storage HBA among several servers.

In one embodiment, buffers associated with the resource virtualization switch are provided to hide PCI Express latency while extending and adapting storage HBA access patterns to the PCI Express fabric. The SCSI layer of the multiple servers including target discovery is completely decoupled from the storage HBA. Targets discovered from the storage HBA are controlled and discovered by the resource virtualization switch. This enables multiplexing several SCSI initiators from different servers onto a single storage HBA. According to various embodiments, the resource virtualization switch allows on the fly addition, deletion and adjustment of virtual HBA bandwidth allocated to each server. For example, a single 4G HBA can be split into 2G, 1G, and 1G and allocated to three separate servers.

An administrator can provision and partition resources at the resource virtualization switch based on particular needs and requirements. Quality of service (QOS) and traffic engineering schemes can be implemented at the bus level. In a conventional architecture, quality of service (QoS) and traffic engineering are available only at the network level and not at the bus level. Traffic associated with particular devices or servers can be given priority or guaranteed bandwidth. The total amount of resources can be decreased while increasing resource utilization. The resource virtualization mechanism can be introduced into existing server racks and farms with little disruption to system operation.

FIG. 1 is a diagrammatic representation showing a conventional implementation for connecting servers to a storage area network. According to various embodiments, the storage area network is implemented using a fibre channel fabric. Server 101 includes a processor 103, memory 105, and HBA 107. The processor 103 communicates with other components and interfaces in the system using an I/O bus and associated I/O controllers. In typical implementations, communications between components and interfaces in server 101 occur over an I/O bus such as PCI. Server 111 includes processors 113 and 117, memory 115, and HBA 119. Communication within server 111 similarly occurs over one or more I/O buses. Server 121 includes a processor 123, memory 125, and HBA 129. In order to allow connection with a storage area network through a switch 141, HBAs 107, 119, and 129 are provided. In one example, a processor 103 is configured to drive HBA 107 to initiate conventional fibre channel fabric login (flogi) and port login (plogi) processes to connect to a switch 141. Similarly, processors 113 and 117, and processor 123 are configured to drive HBAs 119 and 129 to initiate the flogi and plogi protocols. During the login processes, parameters and other information may be exchanged with the storage area network and other storage area network connected ports.

The various HBAs 107, 119, and 129 are also assigned port world wide names (pwwns) and fibre channel identifiers (fc_ids). Each HBA encapsulates data into fibre channel frames for transmission to a fiber channel switch 141. Encapsulation may involve adding appropriate fibre channel headers and addresses. Each HBA is also configured to remove fibre channel headers and addresses and provided data to an associated processor over a system bus when fibre channel frames are received from a fabric.

To provide for reliability, servers 101, 111, and 121 may include multiple HBAs to allow effective switchover in the event one HBA fails. Furthermore, many servers may have redundant lines physically connecting the various HBAs to the fibre channel switch 141. Multiple fibre channel switch ports are also required. Multiple fibre channel switch ports are also required. The resource allocation and system management inefficiencies are magnified by the physical complexities of routing redundant lines. Although only HBAs are noted, each server 101, 111, and 121 may also include network interface cards and hardware accelerators.

Figure 2:
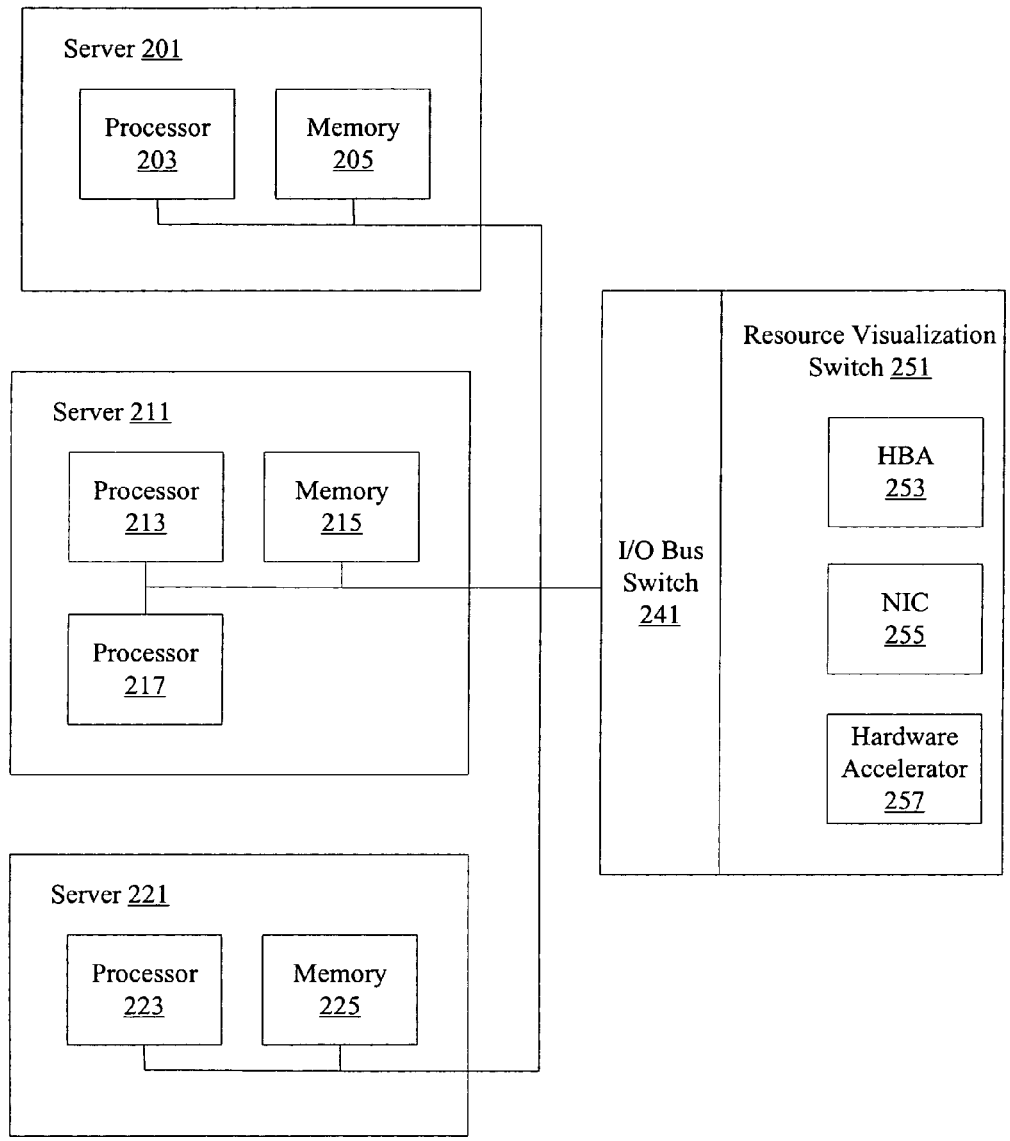
FIG. 2 is a diagrammatic representation showing multiple servers having virtualized resources.

FIG. 2 is a diagrammatic representation showing separate servers connected to a resource virtualization switch 251. Server 201 includes processor 203 and memory 205. Server 211 includes processor 213 and 217 and memory 215. Server 221 includes only processor 223 and memory 225. Components and peripherals in each server 201, 211, and 221 are connected using one or more I/O buses. According to various embodiments, the I/O bus is extended to allow interconnection with other servers and external entities through an I/O bus interconnect such as an I/O bus switch 241. In one example, server 201 no longer uses addresses such as port world wide names (pwwns) associated with an HBA or media access control (MAC) addresses associated with a NIC to communicate with other servers and external networks, but each server is instead configured to communicate with a resource virtualization switch 251 using an I/O bus switch 241.

An I/O bus switch 241 may be a standalone entity, integrated within a particular server, or provided with a resource virtualization switch 251. According to various embodiments, components such as HBA 153, MC 255, and hardware accelerator 257, can be offloaded from servers 201, 211, and 221 onto a resource virtualization switch 251. The resources including MC 243 and HBA 245 are maintained in a shared and virtualized manner on a resource virtualization switch 251. Links can be provided between the resource virtualization switch and external switches such as network switch 261. According to various embodiments, the resource virtualization switch 251 includes control logic that drives an HBA 253 to initiate flogi and plogi processes independently from server 201, 211, and 221. In some instances, flogi and plogi processes may be implemented by a resource virtualization switch 251 control plane even before any servers 201, 211, and 221 are connected to the resource virtualization switch.

According to various embodiments, a series of servers is connected to the resource virtualization switch using a PCI Express bus architecture. In some cases, a PCI Express bridge is used to increase compatibility with some existing systems. However, a PCI Express bridge is not necessarily needed. By using a resource virtualization switch, the number of resources and links can be significantly reduced while increasing allocation efficiency.

Figure 3:
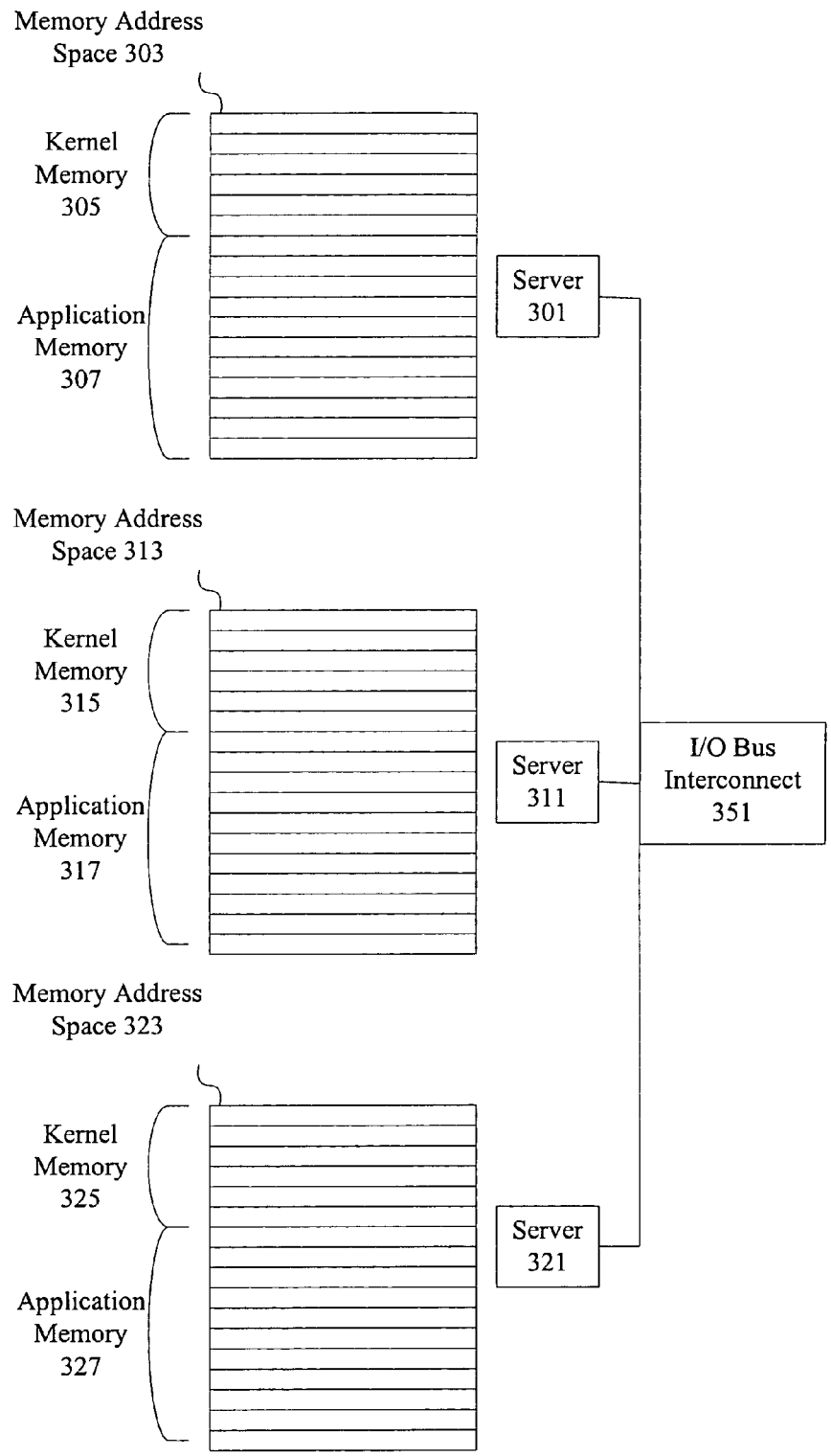
FIG. 3 is a diagrammatic representation depicting separate servers and associated address spaces

FIG. 3 is a diagrammatic representation showing separate servers each associated with a memory address space. According to various embodiments, server 301 includes a memory address space 303 with kernel memory 305 and application memory 307. The memory address space 303 may be a physical memory address space or a virtual memory address space. Server 301 may include one or more processors with access to the memory address space. Server 311 includes a memory address space 313 with kernel memory 315 and application memory 317. The memory address space 313 may be a physical memory address space or a virtual memory address space. Server 311 may include one or more processors with access to the memory address space. Server 321 includes a memory address space 323 with kernel memory 325 and application memory 327. The memory address space 323 may be a physical memory address space or a virtual memory address space. Server 321 may include one or more processors with access to the memory address space.

According to various embodiments, the separate servers 301, 311, and 321 are connected to a resource virtualization switch using an I/O bus. In one embodiment, an I/O bus interconnect 351 such as an I/O bus switch is used to connect the separate servers to external entities such as a storage area network. The I/O bus interconnect 351 is associated with logic that allows aggregation of the memory address spaces 303, 313, and 323. Any logical address space that includes the memory address spaces of multiple computer systems or servers is referred to herein as an aggregated memory address space. In one embodiment, an aggregated memory address space is managed by an I/O bus switch or by a resource virtualization switch.

When a transaction occurs in a memory address space 313, the resource virtualization switch can identify the transaction as a server 311 transaction. The memory address space regions can be used to classify traffic. For example, data received from a server 311 in memory address space 313 can be assigned a particular fibre channel exchange identifier (OX_ID) for transmission onto a storage area network. An fibre channel exchange identifier is one conventional fibre channel parameter that can be used to distinguish traffic. When a reply to the transmission is received from the storage area network, the exchange identifier is used to determine which server the resource virtualization switch forwards the reply to. In one example, a table listing servers, memory address spaces, and fibre channel exchange identifiers is maintained by a resource virtualization switch. When a server writes a data block to a resource virtualization switch, an exchange identifier is assigned to fibre channel frames for transmitting that data block. Reply messages with the same exchange identifier can then be appropriately forwarded to the originating server. It will be recognized that a variety of parameters other than exchange identifiers can be used to classify traffic.

It should also be noted that each server 301, 311, and 321 may be embodied in separate computer cases. In other examples, each server may be embodied in a card, a blade, or even a single integrated circuit (IC) device or portion of an IC device. Techniques for performing interconnection can be implemented on one or more application specific integrated circuits (ASICs) and/or programmable logic devices (PLDs). The entire interconnection mechanism can be provided on a server, a card, a chip, or on a processor itself.

Figure 4:
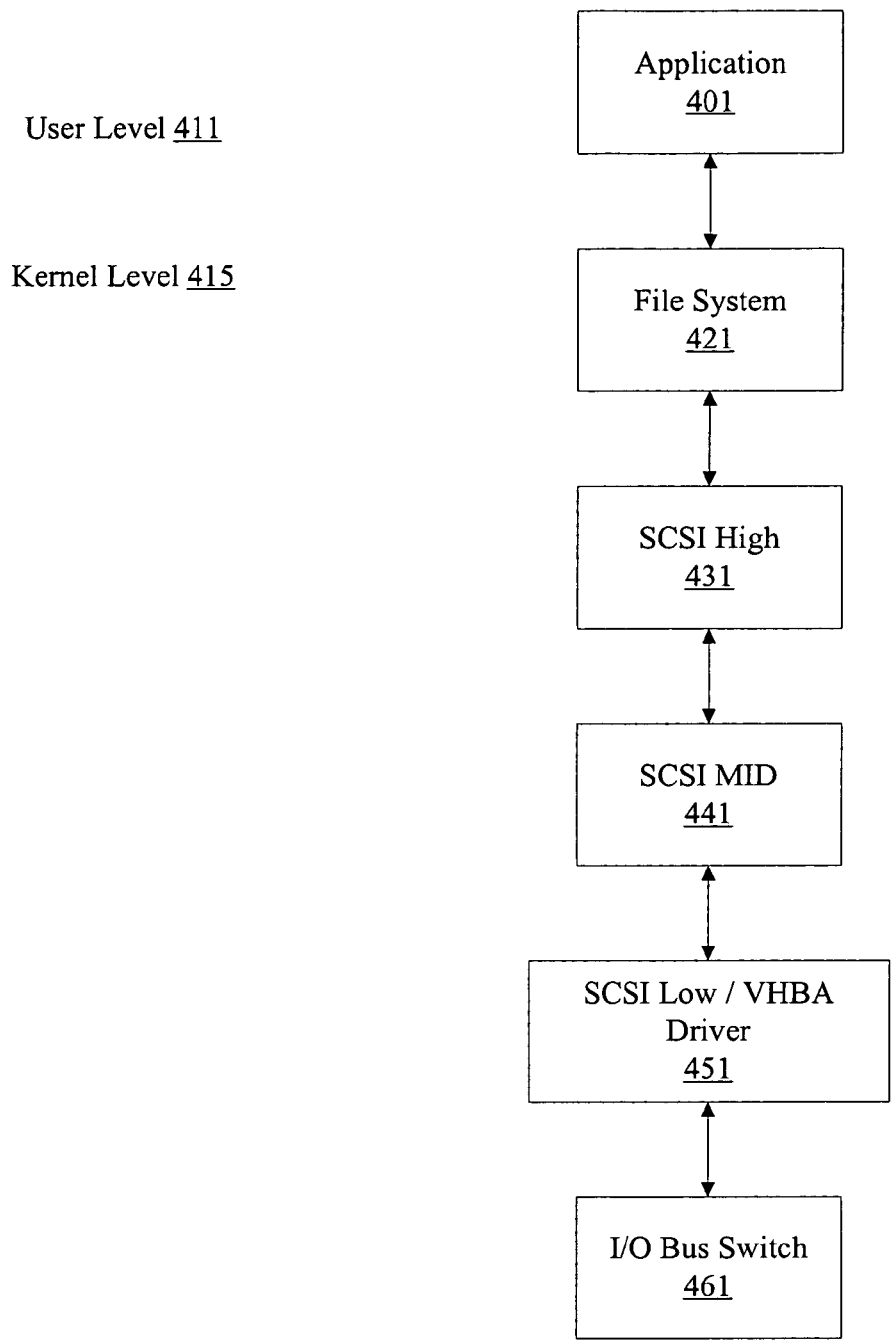
FIG. 4 is a diagrammatic representation depicting a layer model using a virtual device driver.

FIG. 4 is a diagrammatic representation showing one example of a software architecture using the resource virtualization switch of the present invention where a virtualized HBA is used for communication with a storage area network. A user level 411 includes application 401. The user level 411 is coupled to a kernel level 415 file system 421. Various transport layer protocols such as a SCSI high level protocol 431, SCSI mid level protocol 441, and SCSI low level protocol 451. In conventional implementations, a SCSI low level protocol is associated with an HBA driver that operates an HBA. However, the techniques of the present invention contemplate replacing the conventional HBA device driver with a modified device driver or a virtual device driver. Any device driver configured to drive a resource virtualization switch is referred to herein as a modified or virtual device driver. The modified or virtual device driver 451 is configured to allow kernel access to a virtual peripheral. The kernel continues to operate as though it has access to a peripheral such as an HBA included in the server. That is, the kernel may continue to operate as though the HBA can be accessed directly over the bus without using a resource virtualization switch.

However, the virtual device driver supplied is actually driving access to an I/O bus switch 461 and an associated resource virtualization switch. The I/O bus switch 461 and associated resource virtualization switch can then perform processing to determine how to handle the request to access a particular resource such as an HBA. In some examples, the resource virtualization switch can apply traffic shaping or prioritization schemes to various requests, or assign flows to particular HBAs with predetermined bandwidth.

Figure 5:
FIG. 5 is a diagrammatic representation showing one example of a virtual host bus adapter (VHBA) driver.

FIG. 5 is a diagrammatic representation showing one example of a virtual HBA (VHBA) driver. Any mechanisms operating a device that allows the mapping of multiple servers over an I/O bus to a single HBA device is referred to herein as a VHBA driver. When a conventional HBA card or device is connected to a computer system over a bus, a number of SCSI parameters 513 are configured for that HBA. A VHBA driver 511 keeps the same set of SCSI parameters 513 to allow a VHBA driver to operate in conventional systems. In one example, a processor in a server uses the same set of parameters and formats used for an HBA driver to operate a VHBA driver. According to various embodiments, both an HBA and a VHBA driver 511 use the same SCSI parameters 513. A scsi-reset-delay integer specifies the recovery time in milliseconds for a reset delay by either a SCSI bus or SCSI device. A scsi-options property is an integer specifying a number of options through individually defined bits. Other options include the following:

SCSI_OPTIONS_DR—indicates whether the VHBA should grant disconnect privileges to a target device.

SCSI_OPTIONS_LINK—indicates whether the VHBA should enable linked commands.

SCSI_OPTIONS_SYNC—indicates whether the VHBA driver should negotiate synchronous data transfer and whether the driver should reject any attempt to negotiate synchronous data transfer initiated by a target.

SCSI_OPTIONS_PARITY—indicates whether the VHBA driver should run the SCSI bus with parity.

SCSI_OPTIONS_FAST—indicates if the VHBA should not operate the bus in FAST SCSI mode.

SCSI_OPTIONS_WIDE—indicates whether the VHBA should operate the bus in WIDE SCSI mode.

According to various embodiments, the VHBA adapter parameters 515 include SCSI parameters 513. Adapter parameters may include disconnect, link, synchronization, and parity. Adapter parameters allow communication with a resource virtualization switch. In one embodiment, adapter parameters also include rate, transfer rate, bus number, and slot number.

Figure 6:
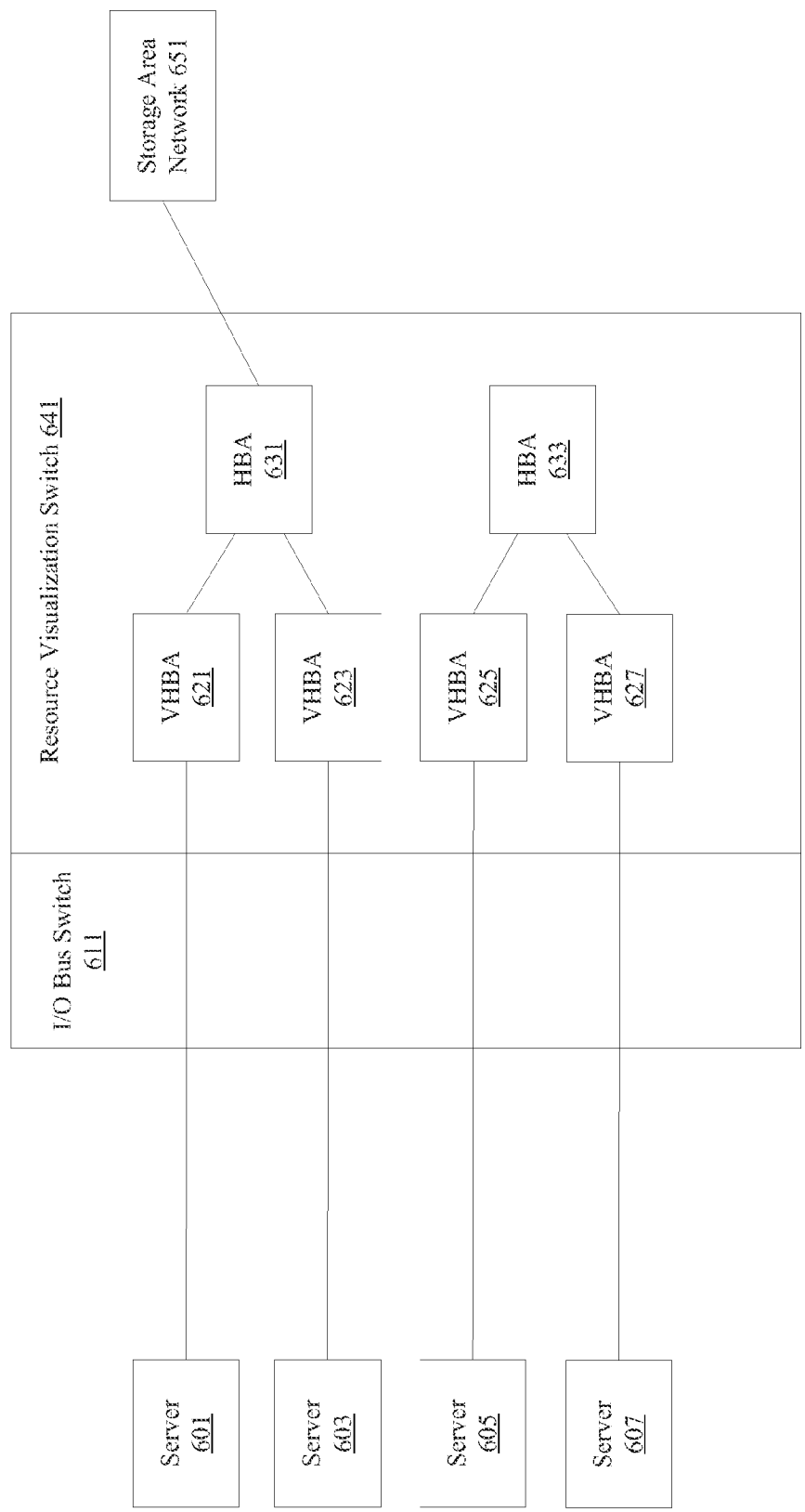
FIG. 6 is a diagrammatic representation showing one example of a VHBA coupled to one or more HBAs.

FIG. 6 is a diagrammatic representation showing multiple VHBAs. According to various embodiments, servers 601, 603, 605, and 607 are connected to VHBAs 621, 623, 625, and 627 respectively through I/O bus switch. Virtual HBAs 621 and 623 are included in a VHBA chip coupled to HBA 631 and VHBAs 625 and 627 are included in a VHBA chip and coupled to HBA 633. In one example, server 601 communicates with multiple entities in a storage area network 651 coupled to HBA 631. Any sequence of data transmissions between a source and destination in a storage area network is referred to herein as an exchange. A server 601 may be involved in multiple exchanges.

An exchange may include a set of one or more non-concurrent related sequences passing between a pair of fibre channel ports. In one embodiment, an exchange represents a conversation such as a SCSI task. Exchanges may be bidirectional and may be short or long lived. In some examples, the parties to an exchange are identified by an Originator Exchange_Identifier (OX_ID) and a Responder Exchange_Identifier (RX_ID).

The multiple exchanges from a particular server 601 are mapped to VHBA 621. According to various embodiments, each VHBA is a logical entity mapped to a particular server. Multiple VHBAs can be included in a single device. In one embodiment, a single chip includes 4 VHBAs and logic for mapping OX_IDs to particular servers. Traffic from multiple VHBAs is aggregated onto a single HBA 631. In one example, HBA 631 is a conventional HBA available from Qlogic Corporation of Aliso Viejo, Calif. or Adaptec Inc. of Milpitas, Calif. Interaction between HBA 631 and 633 appears to a storage area network as though each HBA is included in individual servers.

According to various embodiments, when a data sequence is received from a server 601 at a VHBA 621, the exchange identifier associated with the data sequence is mapped with server 601 and maintained in a database associated with VHBA 621. The HBA 631 then forwards the data in a fibre channel frame to a storage area network with the exchange identifier or some other parameter that can be used by the resource virtualization switch 641 to identify the originating server when a response is received from the storage area network.

Figure 7:
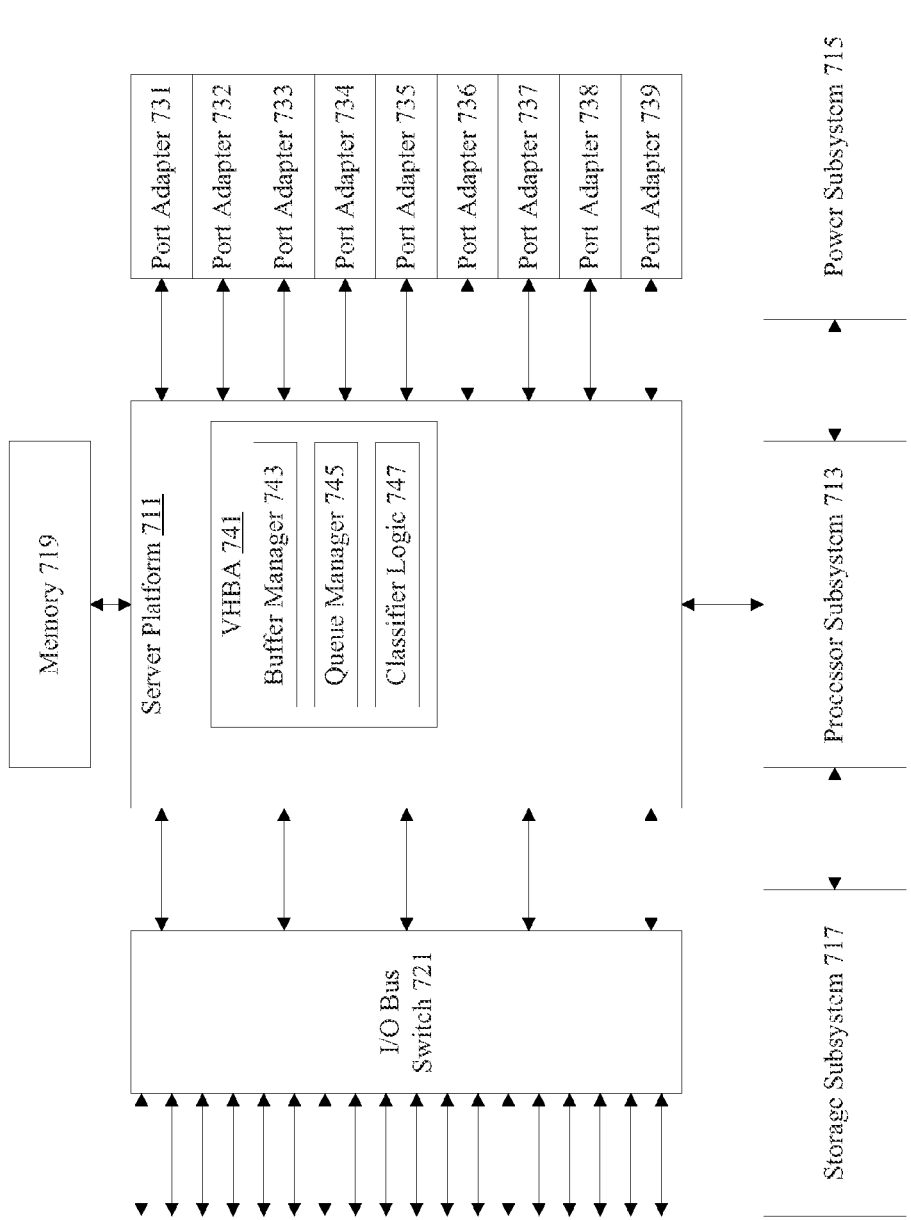
FIG. 7 is a diagrammatic representation showing a resource virtualization switch platform.

FIG. 7 is a diagrammatic representation showing one example of a resource virtualization switch. Although the techniques of the present invention do not require a resource virtualization switch, a resource virtualization switch can be used to increase system functionality and efficiency. An I/O bus switch 721 is connected to multiple computer systems using I/O buses. Port adapters 731-739 are associated with multiple resources such as NICs, HBAs, sATAs, hardware accelerators, etc. The server platform 711 manages interaction between the servers connected to the I/O bus switch 721 and various resources associated with the port adapters 731-739.

The server platform 711 is associated with memory 719 and a processor subsystem 713, a power subsystem 715, and a storage subsystem 717. In some embodiments, the server platform 711 includes tables with information mapping various servers connected through the I/O bus switch 721 and various port adapter resources. The processor subsystem 713 is configured to manage port adapter resource as though the port adapters were included in individual servers. In one example, the processor subsystem 713 is configured to initiate fabric login and port login processes for HBA cards associated with a storage area network. According to various embodiments, the I/O bus switch 721 supports flexible virtual channel configuration, high availability, and dynamic port configurations. Examples of I/O bus switches include the PCI Express switch PEX 8532 available from PLX Technology, Inc. of Sunnyvale, Calif. and the PCI Express switch PES-48G available from MC Semiconductor of Agoura Hills, Calif.

The server platform 711 includes a VHBA device 741 that may be associated with one or more VHBAs mapped to particular servers. In one embodiment, the VHBA device 741 is a VHBA chip having a PCI Express interface coupled to the I/O bus switch 721 and a port adapter interface. In other examples, the VHBA chip may include an HBA port adapter and interface directly with a storage area network instead of interfacing with a conventional HBA. The VHBA chip includes classifier logic 747, a queue manager 745, and a buffer manager 743. According to various embodiments, the classifier logic 747 identifies information such as a frame's destination server and priority. The data can then be buffered in memory by buffer manager 743 and a descriptor for the data is then posted by the queue manager 745. In one embodiment, one or more queues are provided for each connected server. Additional queues may be provided to handle traffic having different levels of priority. Read, write, and control queues can also be provided. In one example, a descriptor includes parameters such as a pointer to the data in memory, a length, a source port, a multicast count, and an exchange identifier.

Each individual server may also include descriptor queues. As will be appreciated, the servers connected to the I/O Bus Switch 721 including the resource virtualization switch arbitrate for access to the I/O Bus. When access is obtained, data can be read from memory associated with one of the server based on the information provided in the descriptor queues.

Figure 8:
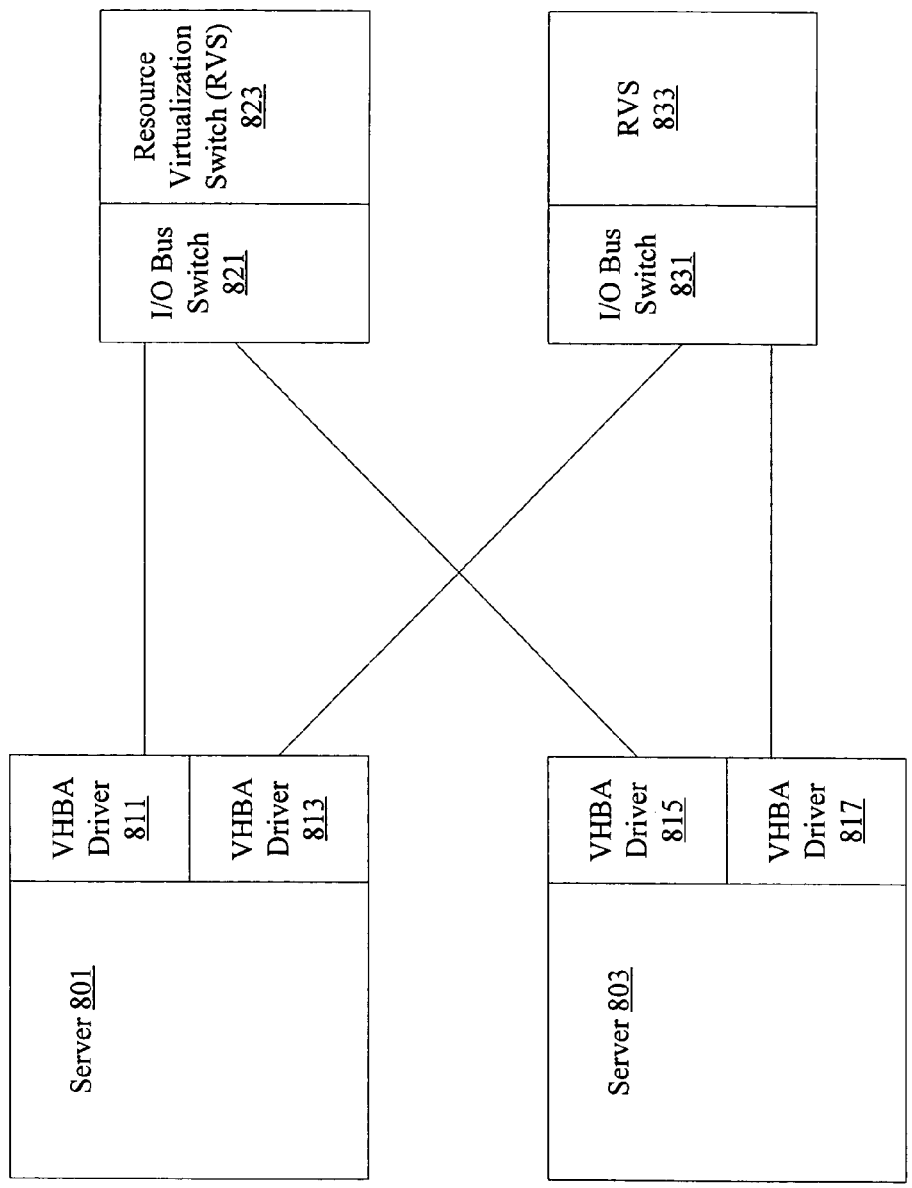
FIG. 8 is a diagrammatic representation showing multipathing and a VHBA.

Redundancy mechanisms are also provided to allow continued operation in the event that an HBA or other resource fails or a resource virtualization switch itself fails. FIG. 8 is a diagrammatic representation showing one technique for providing redundancy. Multipathing is a conventional mechanism that allows the creation of interface groups that allow standby or simultaneous operation of devices. In one example, a server includes multiple HBA cards, each associated with a device driver. One card may be active and the other standby, or the HBA cards may be used simultaneously to allow load balancing. However, requiring multiple HBA cards in conventional implementations can lead to device underutilization.

The techniques and mechanisms of the present invention contemplate providing multipathing using VHBAs. In one embodiment, multiple VHBA device drivers 811 and 813 are configured on a server 801. Multiple VHBA device drivers 815 and 817 are configured on server 803. The VHBA device drivers are associated with different HBAs and possibly different resource virtualization switches. In one embodiment, a server 801 includes an active VHBA driver 811 associated with resource virtualization switch 823. If the HBA in resource virtualization switch 823 fails, or the resource virtualization switch 823 itself associated with the I/O Bus switch 821 fails, the standby VHBA driver 813 associated with I/O bus switch 831 and resource virtualization switch 833 can take over operation. Switchover can occur after a period of inactivity or after failure to receive heartbeat indicators. Existing multipathing mechanisms can be used to provide for HBA redundancy and failover capabilities by using VHBA device drivers and resource virtualization switches.

Figure 9:
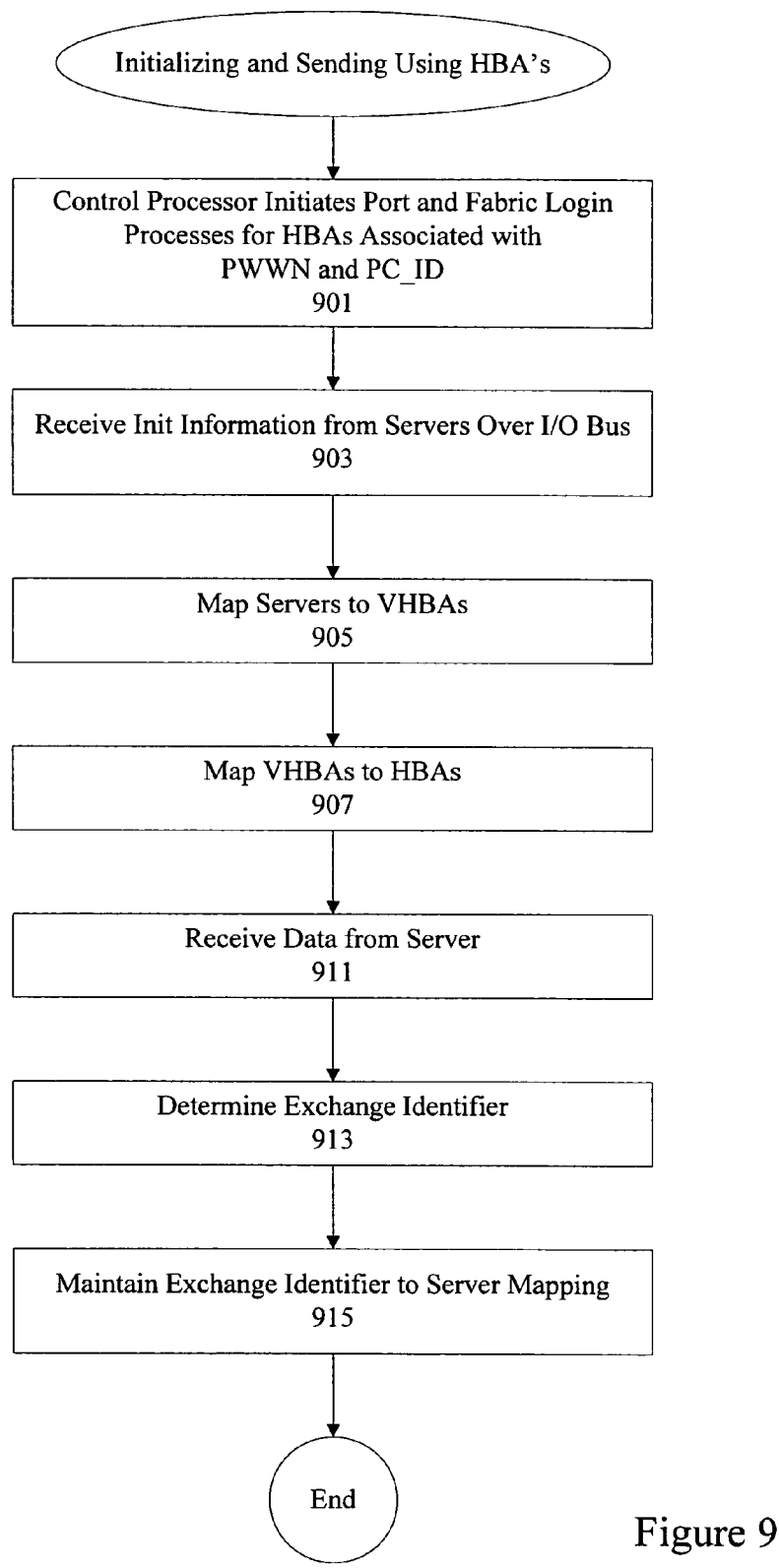
FIG. 9 is a flow process diagram showing a technique for initializing HBAs.

FIG. 9 is a flow process diagram showing one technique for initiating HBAs at a resource virtualization switch. At 901, the control processor initiates port and fabric login processes for multiple HBAs included in a resource virtualization switch. Various name server operations can also be initiated to allow recognition of the HBAs and the storage area network. In some examples, the HBAs each have port world wide names and fibre channel identifiers that allow other entities in a storage area network to communicate with the HBAs. According to various embodiments, entities in a storage area network see individual HBAs as associated with individual servers. At 903, information received from servers over an I/O bus such as the PCI Express bus is received. At 905, servers identified over the I/O bus are mapped to individual VHBAs. According to various embodiments, multiple VHBAs are included in VHBA chips. At 907, one or more VHBAs are mapped to individual HBAs. For example, four VHBAs mapped to four servers connected over an I/O bus are configured to share a single physical HBA.

At 911, a resource virtualization switch receives data from individual servers over the I/O bus. According to various embodiments, data is received after a resource virtualization switch obtains access to the I/O bus and reads a descriptor referencing the data to be transferred. In some examples, an exchange identifier is determined at 913. An exchange identifier may specify a particular conversation between a source server and a destination entity in the storage area network. At 915, an exchange identifier to server mapping is maintained. In typical instances, the exchange identifier is maintained to allow return traffic to be routed to the appropriate server.

Figure 10:
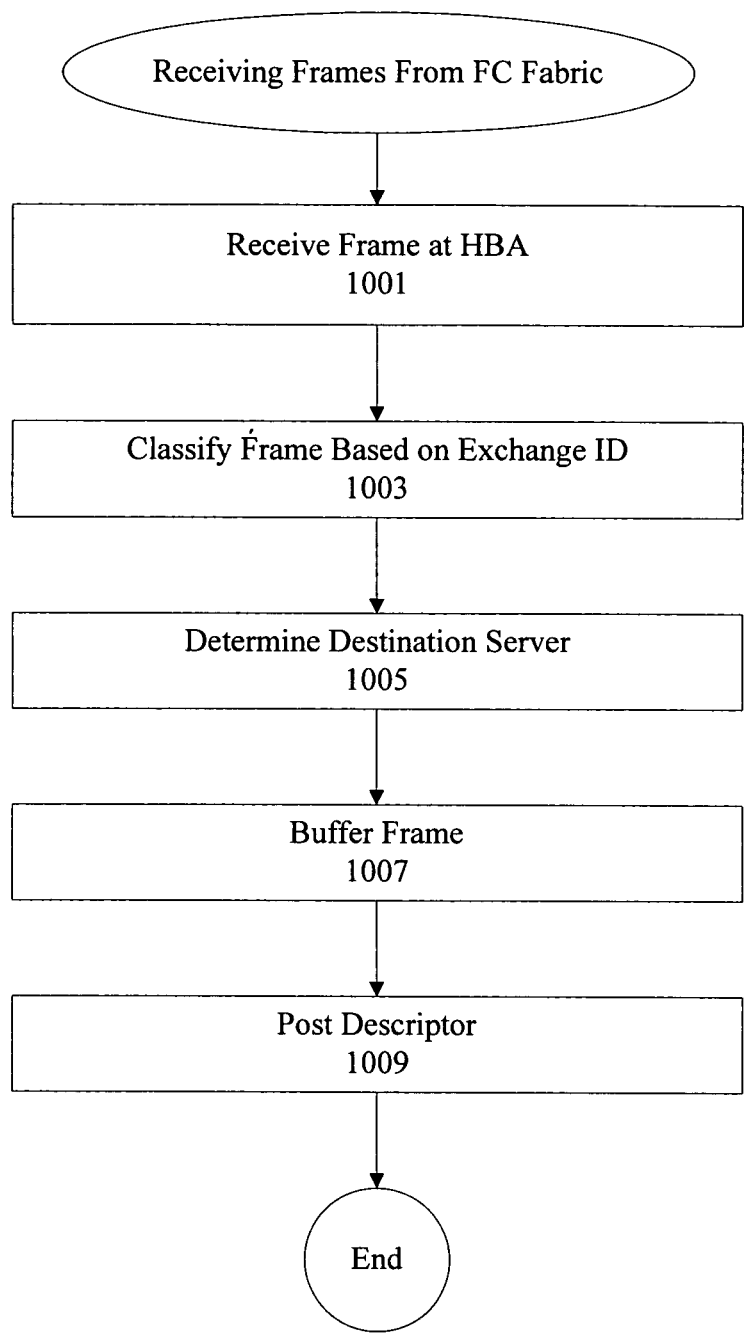
FIG. 10 is flow process diagram showing a technique for receiving using HBAs.

FIG. 10 is a flow process diagram showing a technique for receiving frames from a storage area network. At 1001, a frame is received at an HBA. According to various embodiments, the frame includes a port world wide name, a fibre channel identifier, and exchange information. At 1003, the frame is classified based on the exchange identifier. According to various embodiments, the frame is classified using VHBA classifier logic. The frame may also be classified based on priority or other parameters. At 1005, the destination server is determined based on the exchange identifier. In some examples, information mapping exchange identifiers to corresponding servers is maintained by the resource virtualization switch. At 1007, the frame may be buffered. At 1009, a descriptor referencing data included in the frame is posted. In one embodiment, the descriptor is posted in a queue associated with the destination server. In other examples, the descriptor is posted in the queue associated with the priority of the data and the destination server. When the destination server is able to obtain access to the I/O bus, the descriptor and the reference data is read into the memory of the destination server.

In addition, although exemplary techniques and devices are described, the above-described embodiments may be implemented in a variety of manners. For instance, instructions and data for implementing the above-described invention may be stored on fixed or portable storage media. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

What is claimed is:

1. A resource virtualization switch coupled to a storage area network, the resource virtualization switch comprising:
    a processor; and
    a memory coupled with and readable by the processor and having stored therein a set of instructions which, when executed by the processor, causes the processor to implement:
        a plurality of port adapters including at least a first port adapter and a second port adapter, the plurality of port adapters connected to a storage area network, the storage area network including a plurality of storage area network ports associated with storage area network switches;
        an I/O bus switch providing an interconnection between a plurality of servers and between the plurality of servers and the storage area network, the I/O bus switch directly connected to a PCI Express bus of each of the plurality of servers without use of an Host Bus Adapter (HBA) between the I/O bus switch and the PCI Express bus of each of the plurality of servers, the plurality of servers including at least a first server and a second server; and
        a resource virtualization switch platform operable to map communications from the first server and the second server onto the first port adapter,
        wherein the resource virtualization switch platform comprises a virtual host bus adapter device including a plurality of virtual host bus adapters, wherein the virtual host bus adapter device assigns a virtual host bus adapter to each of the plurality of servers coupled to the I/O bus switch and aggregates traffic from the plurality of virtual host bus adapters onto the first port adapter.

2. The resource virtualization switch of claim 1, wherein the port adapters are Host Bus Adapters (HBAs).

3. The resource virtualization switch of claim 2, wherein the first server includes a first virtual HBA driver.

4. The resource virtualization switch of claim 3, wherein the first server further includes a second virtual HBA driver.

5. The resource virtualization switch of claim 4, wherein the first and second virtual HBA drivers are used for redundancy and load sharing.

6. The resource virtualization switch of claim 4, wherein the first and second virtual HBA drivers are used for multipathing.

7. The resource virtualization switch of claim 6, wherein the first and second virtual HBA drivers are coupled to different resource virtualization switches.

8. The resource virtualization switch of claim 3, wherein the first virtual HBA driver comprises a Small Computer Systems Interface (SCSI) and a resource virtualization switch interface.

9. The resource virtualization switch of claim 1, wherein the first port adapter is coupled to a first storage area network port and the second port adapter is coupled to a second storage area network port.

10. The resource virtualization switch of claim 1, wherein the I/O bus switch is a PCI Express switch.

11. The resource virtualization switch of claim 10, wherein the communications from the first server and second server are mapped onto the first port adapter dynamically.

12. The resource virtualization switch of claim 11, wherein communications from the first port adapter received from the storage area network are transmitted to the first server or the second server based on fibre channel frame information.

13. The resource virtualization switch of claim 12, wherein communications from the first port adapter received from the storage area network are transmitted to the first server or the second server based on fibre channel exchange identifiers.

14. The method of claim 1, wherein the resource virtualization switch is capable of implementing quality of service on a bus level.

15. A method for transmitting data, comprising:
    receiving data from a plurality of servers including at least a first server and a second server, the data received by an I/O bus switch of a resource virtualization switch over a PCI Express bus of each of the plurality of servers, the I/O bus switch providing an interconnection between the plurality of servers and between the plurality of servers and a storage area network, the I/O bus switch directly connected to the PCI Express bus of each of the plurality of servers without use of an Host Bus Adapter (HBA) between the I/O bus switch and the PCI Express bus of each of the plurality of servers;
    associating data received from the first server and the second server with a first port adapter at the resource virtualization switch, the first port adapter connected to the storage area network switch,
    wherein the resource virtualization switch comprises a virtual host bus adapter device including a plurality of virtual host bus adapters, wherein the virtual host bus adapter device assigns a virtual host bus adapter to each of the plurality of servers coupled to the I/O bus connection and aggregates data from the plurality of virtual host bus adapters onto the first port adapter; and
    transmitting the data to the storage area network switch using the first port adapter.

16. The method of claim 15, wherein the resource virtualization switch includes a plurality of port adapters including the first port adapter and a second port adapter.

17. The method of claim 16, wherein the plurality of port adapters are Host Bus Adapters (HBAs).

18. The method of claim 17, wherein the first server includes a first virtual HBA driver.

19. The method of claim 18, wherein the first server further includes a second virtual HBA driver.

20. The method of claim 19, wherein the first and second virtual HBA drivers are used for redundancy and load sharing.

21. The method of claim 19, wherein the first and second virtual HBA drivers are used for multipathing.

22. The method of claim 21, wherein the first and second virtual HBA drivers are coupled to different resource virtualization switches.

23. The method of claim 18, wherein the first virtual HBA driver comprises a Small Computer Systems Interface (SCSI) and a resource virtualization switch interface.

24. The method of claim 15, wherein the first port adapter is coupled to a first fibre channel port and a second port adapter is coupled to a second fibre channel port.

25. The method of claim 15, wherein the I/O bus switch is a PCI Express switch.

26. The method of claim 25, wherein the communications from the first server and second server are mapped onto the first port adapter dynamically.

27. The method of claim 26, wherein communications from the first port adapter received from the storage area network are transmitted to the first server or the second server based on fibre channel frame information.

28. The method of claim 27, wherein communications from the first port adapter received from the storage area network are transmitted to the first server or the second server based on fibre channel exchange identifiers.

* * * * *